Patented Nov. 24, 1925.

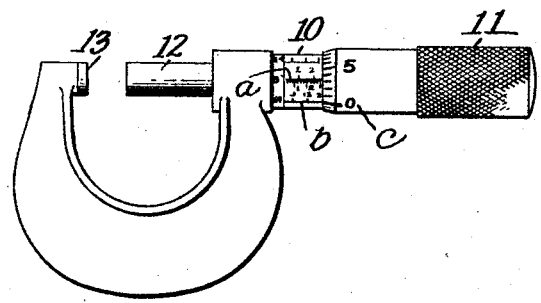
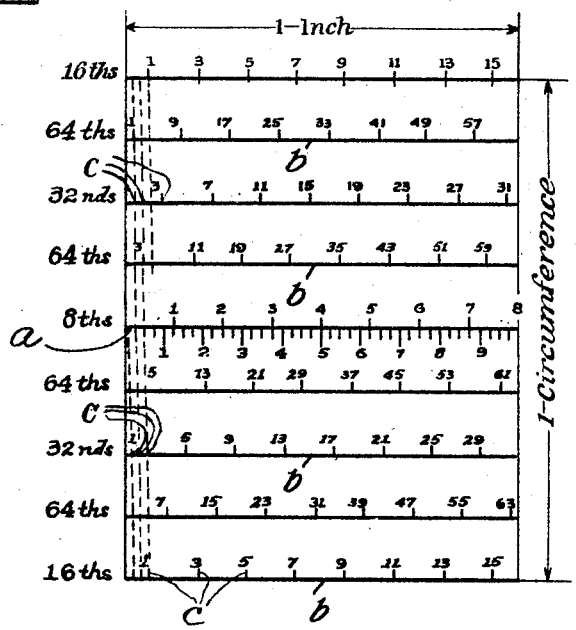

1,562,653

UNITED STATES PATENT OFFICE.

RALPH G. NILSON, OF WORCESTER, MASSACHUSETTS, ASSIGNOR TO NILS NILSON, OF WORCESTER, MASSACHUSETTS.

FRACTION-READING MICROMETER CALIPER.

Application filed November 14, 1921. Serial No. 514,967.

*To all whom it may concern:*

Be it known that I, RALPH G. NILSON, a citizen of the United States, residing at Worcester, in the county of Worcester and State of Massachusetts, have invented a new and useful Fraction-Reading Micrometer Caliper, of which the following is a specification.

This invention relates to a micrometer caliper for use by machinists principally. The chief objects are to improve the ordinary micrometer caliper on the market, without taking any of its valuable features from it, in such a way as to provide for reading the ordinary fractions of an inch directly on the caliper, to provide graduations on the stationary sleeve of the caliper in such a position as to show the ordinary fractions directly and without computation or the use of tables, and more especially to guard against mistakes that are possible in the use of the ordinary caliper.

Reference is to be had to the accompanying drawing, in which—

Fig. 1 is a side view of a micrometer caliper with a preferred embodiment of this invention applied thereto, and showing it in a position for measuring exactly 21/64 of an inch; and Fig. 2 is an enlarged representation of the surface of the stationary graduated sleeve developed and spread out flat, this view representing the entire cylindrical surface.

In the use of the ordinary micrometer caliper, as is well known, a complete turn of the thimble moves the spindle 1/40 of an inch. The circumference of the thimble is divided into twenty-five divisions so that turning it one division advances or retracts the spindle 1/1000 of an inch. In other words, as is well known, the micrometer is constructed and calibrated to measure in thousandths and it is customary to translate ordinary fractions into decimal equivalents, either by figuring them out or by the use of tables and then adjusting the caliper to the proper number of thousandths instead of to the proper fraction of the inch. This would get absolutely accurate results if it were not for the fact that most of the ordinary fractions cannot be expressed in even numbers of thousandths but the decimal must be carried out one, two or three more places. The user, therefore, has to guess at the fractional thousandths and, while this is not important for rough work, it does result in variations and inaccuracies in extremely fine work. Furthermore, there is a chance for mistake, not only in figuring out the proper number of thousandths but in reading the tables and then adjusting the instrument to the proper position.

This invention is designed to do away with these difficulties and to provide, on the stationary sleeve which is already calibrated, additional calibrations to permit of the use of the ordinary micrometer caliper for reading and setting to the ordinary fractions that are used in practice.

For this purpose I take the ordinary caliper with the ordinary scale divided into tenths on the sleeve 10 and the ordinary circular scale divided into twenty-fifths on the thimble 11, as described above and then divide up the cylindrical surface of the sleeve into eight equal divisions circumferentially, starting with the usual zero line $a$. This provides a series of longitudinal parallel lines $b$ spaced equal distances apart around the circumference, and each one being spaced from the next one a distance equal to 1/8 of the circumference. Now, it will be obvious that if the zero point $c$ on the circular scale of the thimble of the caliper is moved from the zero line $a$ to the next adjacent parallel line $b$ the spindle 12 will have been retracted or advanced a distance equal to 1/8 of 1/40 of an inch. This is 1/5 of 1/64. A complete turn of the thimble moves the thimble and spindle relatively along their axes 1/40th of an inch as in the ordinary micrometer caliper described above. If it is desired to move the spindle 1/64 of an inch the zero point on the rotary thimble will have to be turned through five spaces $b$. Other distances can be found in the same way.

These eight lines $b$ are all arranged 1/8 of the circumference of the sleeve from each other so that the thimble is turned 1/8 of a complete revolution when any point thereon passes from one of these lines to the next one. As the thimble, in rotating a complete revolution, moves lengthwise 1/40 or 25/1000 of an inch, the thimble will also move 1/8 of 1/40 which is equivalent to 1/5 of 1/64 when it rotates the distance from one of these lines to the next. In order to retract the spindle 1/8 of an inch it is necessary to rotate the thimble five complete revolutions. If the zero point on the thimble coincides with the zero point on the scale when the spindle is in contact with the anvil 13, as will be the case if the instrument is set properly, it will be necessary to rotate the thimble five complete revolutions and bring the zero point on the thimble back to the 5th division on the zero line *a*, to bring the end of the spindle just 1/8 of an inch from the anvil. Obviously to make this space 1/16 of an inch it is necessary to rotate the thimble 2½ times from zero and that brings the zero point on the thimble into registration with the line exactly opposite the zero line *a*, after rotating the thimble twice. To draw back the spindle 1/32 of an inch from the anvil the thimble would be rotated 1¼ times, which would bring the zero point on the thimble into registration with the second line below the line *a*. In order to get a space of 1/64 of an inch it is necessary to rotate the thimble 5/8 of a revolution. To do this, the zero point on the thimble is brought into registration with that line, that is 5/8 of the way around the sleeve from the zero line.

The zero line *a* on the usual micrometer sleeve is divided into divisions representing 10ths of an inch, each one of them being further divided into four parts or 40ths by smaller division lines. 1/10 and 1/40 equals 1/8. Therefore, I divide the line *a* into 8ths very readily by marking above it divisions each representing five 40ths. I number these as shown in Fig. 2. So in my use of the caliper this line represents 8ths of an inch. I mark what may be called the margin of the sleeve at the end with the term 8ths at the left to indicate that this line means 8ths. The opposite line half way around represents 16ths and is so marked. The two lines a quarter way around in each direction represent 32nds and and are marked accordingly. The other four lines coming between the ones just described all represent 64ths and are marked at the left to show that fact. All this is clearly shown on Fig. 2. These 64ths lines are further divided, each one into 8ths, but the first division on each 64th line is, of course, less than an 8th from the edge and controlled by the fraction of an inch which the micrometer measures when the zero point on the rotary thimble points to it.

In Fig. 2 I have shown this entire surface developed and enlarged. The horizontal length of this rectangular figure is one inch. The 8ths line at the center is divided by smaller divisions below it into 5ths of an 8th of an inch and five of these divisions, therefore, represent 1/8 of an inch. This is expressed on the drawing by the numerals 1 to 8 and corresponding division lines above the ordinary calibrations, which I retain as I wish to be able to use the micrometer in the ordinary way in which it is now used to indicate thousandths. I divide up the 16ths line to show the number of 16ths measured by the micrometer when the zero point on the thimble is on the 16ths line. This is divided into the odd numbers, or 1 to 15 inclusive, and the distance between each two is 2/16 of an inch. The number 1 is located, so to speak, a half a space from the left hand line. The two 32nds lines are divided in a similar manner and also the four 64ths lines. Each one is designated at the left by the proper denomination.

The divisions on these horizontal lines, indicated by the transverse marks *c*, constitute part of a helix traced around the sleeve by the zero point on the thimble as the thimble is drawn back by turning it. Part of this helix is indicated in dotted lines in Fig. 2. As a matter of fact the horizontal lines serve only to furnish, by their junction with the helix, the points for use in getting the exact measurements. The helix, however, does not appear on the sleeve physically except as it is represented by these divisions.

Now in using the device, if the operator wishes to set the spindle 1/64 inch from the anvil, the only place where he can find a point 1 on any one of the four 64ths lines is on the one which is 5/8 way around from the zero or 8ths line. To take this up in another manner, let it be assumed that it is desired to make the space between the spindle and anvil 9/64 of an inch. Starting from zero the operator turns the thimble all the way around five times which will open the micrometer 1/8 of an inch and then advances it five spaces more until the zero point thereon comes into registration with the numeral 9 on one of the 64ths lines. Now, if he wishes to advance it 1/64 of an inch more and bring it to 10/64 or 5/32, he has to keep on turning the thimble in the same direction until the zero comes to the point numbered 5 on the 32nds line in the lower part of Fig. 2. In other words, he has advanced it five spaces circumferentially. Now, to bring it to the next 64ths division, that is, 11/64, he advances it five more spaces to the point 11 on the 64ths line just above the 8ths line in Fig. 2. If he turns it another five spaces he will have advanced it another 64th of an inch so that the total space between the spindle and the anvil is 12/64 or 3/16 and that is accomplished at the time when the zero point on the thimble registers with the division numbered 3 on the 16ths line.

It is believed that these illustrations are sufficient to show the operation of the device all the way through. It will be observed that the first division on each of the horizontal lines comes at a point at a certain distance from the circumferential line passing through the zero point. These distances are all different on the different lines. On the 64ths line shown at the top of Fig. 2, and actually just beyond the 16ths line on the back of the sleeve, is the first division. The second division comes on the 32nds line below the 8ths line and, of course, represents 2/64 or 1/32 and it is five spaces circumferentially from the one numbered 1 on the 64ths line and 1/64 from it longitudinally. The next point is five spaces further around and is the point numbered 3 on the 64ths line next above the 8ths line and represents a space 3/64 of an inch. The next one is numbered 1 on the 16ths line representing 1/16 of an inch or 4/64, etc.

It can be seen, therefore, that all of the 64ths and multiples thereof can be measured on this scale and the micrometer set exactly to the point necessary to move the spindle the desired distance. There is no computing required nor any tables. These are entirely done away with and a still more important point is that the operator does not have to guess at fractions of a thousandth as in the old system, but he gets his measurement directly on the scale and knows that it is accurate. It is to be observed further that the micrometer of the ordinary type is used and can be employed for measuring thousandths as its scale has not been modified in any way. Therefore, I get all the advantages of the ordinary micrometer caliper and provide it with very simple means by which it can be used to measure the ordinary fractional divisions of an inch directly.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. Means for indicating in common fractions of an inch the adjustment of a micrometer, the screw of which has the usual 40 threads to the inch, said means comprising two coaxial relatively rotatable cylindrical members, one being hollow and telescoped on the other and the two being interconnected through the gauge screw so as to be relatively shifted axially thereby in accord with the pitch of the screw upon relative rotation of the members, the inner of said members being provided upon its cylindrical surface with eight lines extending longitudinally of the cylinder and equally spaced therearound, each of said longitudinal lines being provided with division marks, each of said division marks being numbered to show the numerator of the fraction indicated thereby and the longitudinal lines being severally identified with numbers corresponding respectively to the denominator of the fractions indicated by the marks thereon, the outer member being provided at the end edge thereof overlying the inner member with a zero mark and with a circumferential scale of graduations, each division mark of the longitudinal lines being so positioned that, when the zero point of the outer member is brought in registration with said mark, the fraction indicated thereby will show the amount by which the two members have been relatively axially shifted from their initial or zero position.

2. Means for indicating in common fractions of an inch the adjustment of a micrometer, the screw of which has the usual 40 threads to the inch, said means comprising two coaxial relatively rotatable cylindrical members, one being hollow and telescoped on the other and the two being interconnected through the gauge screw so as to be relatively shifted axially thereby in accord with the pitch of the screw upon relative rotation of the members, the inner of said members being provided upon its cylindrical surface with eight lines extending longitudinally of the cylinder and equally spaced therearound, each of said longitudinal lines being provided with division marks, each of said division marks being numbered to show the numerator of the fraction indicated thereby and the longitudinal lines being severally identified with numbers corresponding respectively to the denominator of the fractions indicated by the marks thereon, the outer member being provided at the end edge thereof overlying the inner member with a zero mark and with a circumferential scale of graduations, the division marks of the longitudinal lines being so positioned that said marks occur only on every fifth longitudinal line taken in succession along the path traced by the zero mark on the outer member at the intersection of said path.

3. As an article of manufacture, a micrometer caliper comprising a fixed sleeve and a rotary thimble surrounding and so connected with the sleeve as to be moved axially 1/40th of an inch for each complete revolution of the thimble, the sleeve having a longitudinal graduated line thereon and the thimble having an end edge for registration with the graduations of said line, said sleeve being provided with other longitudinal lines parallel with the graduated line and evenly spaced therewith around the sleeve and with transverse marks intersecting each of said longitudinal lines and located on a single imaginary helix around the sleeve, and designating directly at all times the exact distance in even multiples of one 128th of an inch the distance of the end edge of the thimble from the zero point on said longitudinal scale, said thimble always covering and concealing the parts of said longitudinal lines overlapped by the edge of the thimble and said edge being provided with a zero point for registration with said longitudinal lines.

4. As an article of manufacture, a micrometer caliper comprising a relatively rotatable sleeve and thimble so connected that one moves axially on the other 1/40th of an inch for each complete relative rotation, the sleeve having a longitudinal graduated line thereon and the thimble having a reading edge for registration with the graduations of said line which edge is marked with a zero point, said sleeve being provided with other longitudinal lines parallel with the graduated line and evenly spaced therewith around the sleeve, each of said longitudinal lines being divided into equal divisions by marks 1/8th of an inch apart but leaving the end divisions of all the lines except the graduated line less than 1/8th of an inch, the division marks being each numbered to show the numerator of the fraction of an inch by which the spindle and anvil of the gauge are separated when the said point of the thimble registers with such mark and the longitudinal lines being each numbered to correspond with the denominator of the fractions indicated thereon.

5. Means for indicating in common fractions of an inch the adjustment of a micrometer, the screw of which has the usual 40 threads to the inch, said means comprising two co-axial relatively rotatable cylindrical members, one being hollow and telescoped on the other and the two being interconnected through the gage screw so as to be relatively shifted axially thereby in accord with the pitch of the screw upon relative rotation of the members, the inner of said members being provided upon its cylindrical surface with eight lines extending longitudinally of the cylinder, equally spaced therearound and all terminating in common planes perpendicular to its axis, each of these longitudinal lines being provided with division marks spaced from one another by 1/8th of an inch but so distributed as to leave end spaces different for the different lines, the end spaces of one line only being 1/8th of an inch, those of the others being less than that amount, each division mark being numbered to show the numerator of the fraction indicated thereby and the longitudinal lines being severally identified with numbers corresponding respectively to the denominator of the fractions indicated by the marks thereon, the outer member being provided at the end edge thereof overlying the inner member with a zero mark and with a circumferential scale of graduations, each division mark of the longitudinal lines being so positioned that, when the zero point of the outer member is brought in registration with said mark, the fraction indicated thereby will show the amount by which the two members have been relatively axially shifted from the position which they had when the zero point of the outer member registered with the initial or zero division of that longitudinal line which is divided into eighths of an inch throughout its entire length.

In testimony whereof I have hereunto affixed my signature.

RALPH G. NILSON.